United States Patent
Balakrishnan et al.

(10) Patent No.: US 9,615,377 B2
(45) Date of Patent: Apr. 4, 2017

(54) APPARATUS, SYSTEMS AND METHODS FOR PRIORITIZING FREQUENCY SELECTION FOR A MOBILE DEVICE

(71) Applicant: APPLE INC., Cupertino, CA (US)

(72) Inventors: Swaminathan Balakrishnan, Sunnyvale, CA (US); Sarma V. Vangala, San Jose, CA (US); Sreevalsan Vallath, Dublin, CA (US); Prateek Sharma, Cupertino, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 14/725,764

(22) Filed: May 29, 2015

(65) Prior Publication Data

US 2016/0353460 A1 Dec. 1, 2016

(51) Int. Cl.
*H04W 72/00* (2009.01)
*H04W 72/10* (2009.01)
*H04W 72/04* (2009.01)
*H04W 48/14* (2009.01)

(52) U.S. Cl.
CPC .......... *H04W 72/10* (2013.01); *H04W 48/14* (2013.01); *H04W 72/0453* (2013.01)

(58) Field of Classification Search
CPC .............................. H04W 48/20; H04W 76/02
USPC ...... 455/552.1, 434, 435.2, 422.1, 439, 438; 370/252, 255, 329, 331, 431
See application file for complete search history.

(56) References Cited

U.S. PATENT DOCUMENTS

| | | | | |
|---|---|---|---|---|
| 2009/0258649 A1* | 10/2009 | Salowey | ................. | H04W 4/02 455/435.2 |
| 2009/0298497 A1* | 12/2009 | Lee | ........................ | H04W 48/08 455/434 |
| 2013/0273965 A1* | 10/2013 | Jechoux | ................ | H04W 88/06 455/552.1 |
| 2014/0376393 A1* | 12/2014 | Shi | ........................ | H04W 24/06 370/252 |

* cited by examiner

*Primary Examiner* — Kiet Doan
(74) *Attorney, Agent, or Firm* — Fay Kaplun & Marcin, LLP (57) ABSTRACT

Described herein are systems and methods for prioritizing frequency selection of a user equipment ("UE") having a transceiver configured to enable the UE to establish a connection with a network using at least two communication protocols. A method may comprise recording, at the UE, a camped frequency and a camped band with which the UE is communicating with the first network in the first protocol, disconnecting from the first network and connecting to the second network, and disconnecting from the second network and reconnecting to the first network, wherein the reconnecting to the first network includes determining whether one of the camped frequency or a different frequency within the camped band is available for reconnection to the first network, and reconnecting to the first network using the one of the camped frequency or the different frequency within the camped band.

18 Claims, 4 Drawing Sheets

APPARATUS, SYSTEMS AND METHODS FOR PRIORITIZING FREQUENCY SELECTION FOR A MOBILE DEVICE

BACKGROUND

In wireless telecommunication networks, the Long-Term Evolution, or "LTE," is defined as a standard for wireless communication of high-speed data for mobile phones and data terminals. The LTE standard is developed by the Third Generation Partnership Project ("3GPP") and the Institute of Electrical and Electronics Engineers ("IEEE"). An exemplary LTE access network is a wireless network of base stations, or evolved NodeBs ("eNBs"), that are interconnected without a centralized intelligent controller. By distributing the intelligence among the eNBs in the LTE network, the time for setting up a connection with a mobile device (e.g., user equipment ("UE")) is reduced as well as the time required for a handover to another eNB. Furthermore, through the development of the LTE standard, mobile devices are able to increase their capacity and speed using a different radio interface together with core network improvements.

As with any Radio Access Technology, an exemplary LTE network may utilize duplex communications, wherein point-to-point transmissions are composed of two connected devices that communicate with one another in both directions. Thus, a duplex system includes two distinct paths, each carrying information in only one direction. Furthermore, the exemplary LTE network may also utilize channel access methods in point-to-multipoint transmission, wherein forward and reverse communication channels are divided on the same physical communications medium, such as through time-division duplexing ("TDD") and frequency-division duplexing ("FDD").

Through the use of TDD and FDD modes, the exemplary LTE system may share the critical resources of time and frequency among mobile subscribers or terminals in the network. FDD uses the idea that the transmission and reception of signals are achieved simultaneously using two different frequencies. Using FDD it is possible to transmit and receive signals simultaneously as the UE is not tuned to the same frequency. TDD may use only a single frequency while sharing the channel between transmission and reception and spacing them apart by multiplexing the two signals on a time basis. TDD mode then shares that single frequency by assigning alternating time slots to transmit and receive operations. Accordingly, TDD is used with data transmissions of a short burst of data in each direction. As the transmission periods are relatively short, no time delay would be noticed on voice transmissions resulting from the time delays introduced by using TDD mode.

With each of the modes, there can be associated disadvantages. For instance, the FDD mode can require a large amount of frequency spectrum, generally at least twice the spectrum needed the TDD mode. In addition, there should be adequate spectrum separation between the transmit/receive channels. Furthermore, with FDD, it can be difficult to utilize special antenna techniques like multiple-input multiple-output ("MIMO") and beamforming, wherein these technologies are a core part of the LTE network strategies for increasing data rates. Specifically, it can be difficult to make antenna bandwidths broad enough to cover both sets of spectrum.

The primary advantage of TDD mode can be that, unlike FDD mode, the TDD mode only needs a single channel of frequency spectrum. Furthermore, the TDD mode does not require the use spectrum-inefficient guard bands or channel separations as needed in the FDD mode. However, the downside of TDD mode can be that successful implementation may require a very precise timing and synchronization system at both the transmitter and receiver to ensure that time slots do not overlap or otherwise interfere with one another.

SUMMARY

Described herein are apparatuses, systems and methods for prioritizing frequency selection of a user equipment ("UE") having a transceiver configured to enable the UE to establish a connection to a first network at a camped frequency within a camped band using a first protocol and a second network using a second protocol. The methods including disconnecting from the first network and connecting to the second network and disconnecting from the second network and reconnecting to the first network. The reconnecting to the first network including determining whether one of the camped frequency or a different frequency within the camped band is available for reconnection to the first network, and reconnecting to the first network using the one of the camped frequency or the different frequency within the camped band Further described herein is a UE including a a transceiver configured to enable the UE to establish a connection to a first network at a camped frequency within a camped band using a first protocol and a second network using a second protocol. The UE further includes a processor that instructs the transceiver to disconnect the UE from the first network and connect the UE to the second network and instructs the transceiver to disconnect the UE from the second network and reconnect the UE to the first network. The reconnecting to the first network includes scanning only the camped frequency to determine if the camped frequency is available and when the camped frequency is available, reconnecting to the first network using the camped frequency.

Further described herein is a non-volatile computer-readable medium that stores instructions that, when executed, cause the performance of any action or combination of actions. The actions may include disconnecting from the first network and connecting to the second network and disconnecting from the second network and reconnecting to the first network. The reconnecting to the first network includes determining whether one of a camped frequency or a different frequency within a camped band is available for reconnection to the first network, and reconnecting to the first network using the one of the camped frequency or the different frequency within the camped band.

DETAILED DESCRIPTION

The exemplary embodiments may be further understood with reference to the following description and the appended drawings, wherein like elements are referred to with the same reference numerals. The exemplary embodiments describe an apparatus, system and method for prioritizing a cell reselection procedure based on a previously used frequency and/or band. In the exemplary embodiments, a mobile device will be described as user equipment ("UE") and the base station will be described as an evolved Node B ("eNB") base station, which is generally known as being a base station associated with an LTE radio access network ("LTE-RAN"). However, it will be understood by those skilled in the art that UEs and base stations operating in accordance with other network standards may also implement the exemplary embodiments in accordance with the functionalities and principles described herein.

As discussed above, the usage of either a TDD mode or a FDD mode in an LTE-RAN offers both advantages and disadvantages. Due to the advantages of both TDD and FDD mode, some network providers (e.g., Sprint, AT&T, Verizon, etc.) operate in both LTE modes. Specifically, network providers would like to use the spectrum capacity efficiently and therefore implement traffic management patterns. For example, an exemplary network provider may propose to use the higher frequency range band of LTE spectrum in TDD mode. This allows the LTE-RAN to have a greater capacity, such that a greater number of subscribers are allowed to maintain a connection with a specific cell, e.g., more subscribers can register or "camp" on a particular cell. Alternatively, operating in the lower frequency band spectrum of LTE in FDD mode may allow for greater cell coverage at the eNBs.

In the native LTE environment, operating with both TDD mode and FDD mode may be achieved by assigning the cell reselection priority to respective bands that are broadcasted, such as via system information block type 5 ("SIB5"). One skilled in the art would understand that SIB5 data includes information relevant to inter-frequency cell re-selection, e.g., information about other Evolved Universal Terrestrial Radio Access ("E-UTRA") frequencies and inter-frequency neighboring cells relevant for cell re-selection. Furthermore, the SIB5 data may include cell re-selection parameters common for a frequency as well as cell specific re-selection parameters.

In some instances, the UE may fallback from the LTE-RAN to a legacy radio access network ("RAN"), such as a Code Division Multiple Access ("CDMA") network or a Global Systems for Mobile communications ("GSM") network. There may be multiple reasons for the UE falling back to the legacy RAN network. In one exemplary embodiment, a network provider may utilize an enhanced Circuit Switched Fallback ("eCSFB") infrastructure such that the UE may use the legacy RAN for voice calls, while using the LTE-RAN for data connectivity. Thus, when originating or receiving a voice call, the UE may be connected to the legacy RAN. After the completion of the voice call, the UE may reconnect to the LTE network.

In current implementations, the reconnection procedure includes the UE performing a cell search and the UE will camp on the strongest cell and band found during the search. This almost exclusively results in the UE camping on a frequency in the FDD band because the FDD band will be the strongest band. However, this method of cell selection may defeat the traffic management strategy of the network provider. Specifically, as described above, the network provider attempts to distribute the UEs between FDD mode and TDD mode to implement a traffic management strategy. Accordingly, the exemplary embodiments provide an apparatus, a system and a method for prioritizing cell reselection based on a previously used frequency and/or band by the UE. By prioritizing the cell reselection process based on frequency and/or band when the UE is reconnecting to the LTE-RAN, it is more likely that the UE will reconnect in the LTE mode (e.g., FDD or TDD) as the UE previously used when connected to the LTE-RAN (e.g., before the UE connected to the legacy RAN). Because the UE is more likely to reconnect to the LTE-RAN in the same mode, it is less likely that the UE will degrade or defeat the network provider's traffic management strategy.

Figure 1:
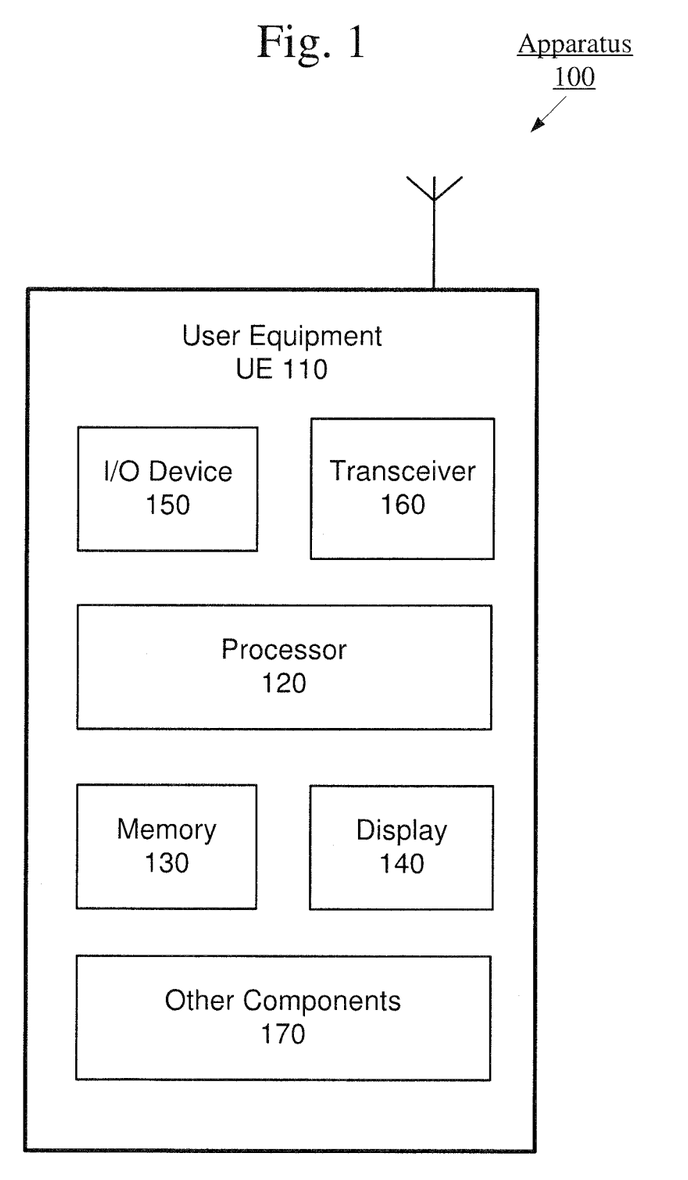
FIG. 1 shows an exemplary apparatus 100 for prioritizing cell reselection based on a previously used frequency and/or band by a UE, according to various embodiments described herein.

FIG. 1 shows an exemplary apparatus 100 for prioritizing cell reselection based on a previously used frequency and/or band by a UE, according to various embodiments described herein. The exemplary apparatus 100 may include the mobile device, such as a UE 110. The UE 110 may represent any electronic device that is configured to perform wireless functionalities. For example, the UE 110 may be a portable device such as a smartphone, a tablet, a phablet, a laptop, a wearable, etc. In another example, the UE 110 may be a client stationary device such as a desktop terminal. The UE 110 may be configured to perform cellular and/or WiFi functionalities. The UE 110 may include a processor 120, a memory arrangement 130, a display device 140, an input/output ("I/O") device 150, a transceiver 160, and other components 170. The other components 170 may include, for example, an audio input device, an audio output device, a battery that provides a limited power supply, a data acquisition device, ports to electrically connect the UE 110 to other electronic devices, etc.

The transceiver 160 may be a hardware component configured to transmit and receive data with network entities, such as the eNB of an LTE-RAN and a legacy base station of a legacy RAN. Thus, the transceiver 160 may include multiple transceivers or may have the capability of operating in different modes. The transceiver 160 may enable communication with the network entities or with other electronic devices directly or indirectly through the wireless network protocol to which the UE 110 is connected. The transceiver 160 may operate on a variety of different frequencies or channels (e.g., set of consecutive frequencies). For example, the transceiver 160 may connect to the legacy RAN using corresponding frequencies and also connect to the LTE-RAN using corresponding frequencies. Those skilled in the art will understand that the set of frequencies that may be used to connect with the various RANs may be set by the standards that govern the various RANs. Thus, an antenna or multiple antennae (not shown) coupled with the transceiver 160 may enable the transceiver 160 to send and receive signals in these frequency bands.

The processor 120 may be configured to execute a plurality of applications of the UE 110. For example, the applications may include a web browser when connected to a communication network via the transceiver 160. The use of the web browser may entail requesting uplink grants to transmit requests to the web browser or downlink grants to receive data from a website. In another example, the processor 120 may implement a cell reselection application that prioritizes cell reselection based on a previously used frequency and/or band by the UE 110. As described above, the UE 110 is capable of connection to both the LTE-RAN and a legacy RAN. The cell reselection application prioritizes the cell reselection for the UE 110 when the UE 110 reconnects to the LTE-RAN after connecting to the legacy RAN.

It should be noted that the above noted applications being an application (e.g., a program) executed by the processor 120 is only exemplary. The functionality associated with the applications may also be represented as a separate incorporated component of the UE 110 or may be a modular component coupled to the UE 110, e.g., an integrated circuit with or without firmware. In addition, in some UEs, the functionality described for the processor 120 is split among two processors, a baseband processor and an applications processor. The exemplary embodiments may be implemented in any of these or other configurations of the UE.

The memory arrangement 130 may be a hardware component configured to store data related to operations performed by the UE 110. Specifically, the memory arrangement 130 may store data related to functionalities described herein. The display device 140 may be a hardware component configured to show data to a user while the I/O device 150 may be a hardware component that enables the user to enter inputs. It should be noted that the display device 140 and the I/O device 150 may be separate components or integrated together such as a touchscreen.

Figure 2:
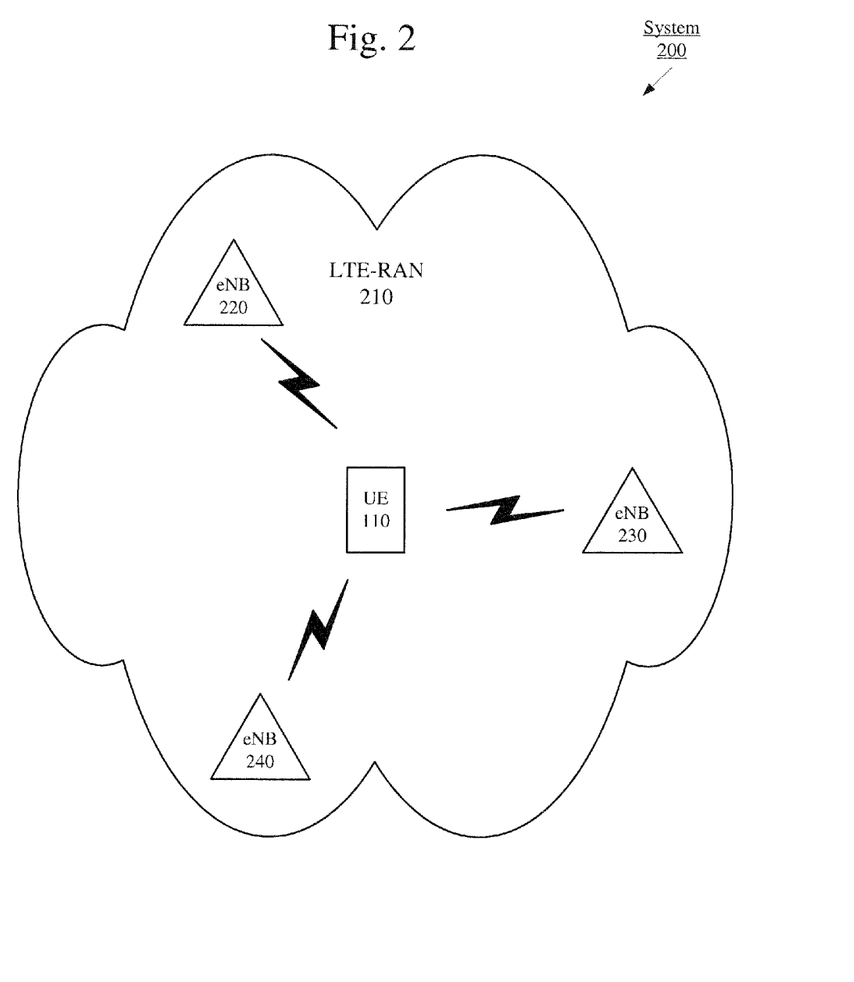
FIG. 2 shows an exemplary system 200 in which a UE that prioritizes cell reselection based on a previously used frequency and/or band may operate, according to various embodiments described herein.

FIG. 2 shows an exemplary system 200 in which a UE that prioritizes cell reselection based on a previously used frequency and/or band may operate, according to various embodiments described herein. The exemplary system 200 may include the UE 110 in communication with a plurality of eNBs 220-240 of an LTE-RAN 210. As described above, the UE 110 may also be capable of connecting to a legacy RAN. However, it is not necessary to illustrate the legacy RAN in FIG. 2 because the exemplary cell reselection process is performed by the UE 110 to reconnect to the LTE-RAN 210.

When the UE 110 is initially powered on, the UE 110 may be within the range of the plurality of eNBs 220-240. In certain instances, the UE 110 may be surrounded by not only multiple eNBs from one network provider, but by multiple eNBs from multiple network providers. Out of those many eNBs, the UE 110 may only register, or camp, on one serving cell. Specifically, the UE 110 may perform a cell search procedure, wherein the cell scans and detects the available cells in the area. Throughout this description the terms "cell search," "search," "scan," and their variants are used interchangeably to refer to a procedure for determining if a cell is available for connection by the UE 110 at a particular frequency. An "available" cell refers to a cell to which the network will allow the UE 110 to attach. There may be various parameters that are used to determine if the cell is available, e.g., the strength of the received signal at the UE 110, the throughput or congestion of the cell, etc.

In order to determine which particular single cell for the UE 110 to register, the UE 110 goes through a specific decision making process called cell selection. During the cell selection process, the UE 110 observes various cell selection criteria, such as transmission power, signal strength, quality indicators, network type, service type, etc. Based on these criteria, the UE 110 will camp on one of the eNBs of the LTE-RAN 210, e.g., eNB 220. As described above, the UE 110 will exchange information (e.g., uplink (UL) and downlink (DL) communications) with the eNB 220 on a frequency within a frequency band that has been selected. Based on a variety of factors, this frequency/band combination may include the UE 110 operating in FDD mode or TDD mode based on the network providers traffic management scheme.

As noted above, the UE 110 is capable of using at least two network protocols, such as the LTE RAN for data connectivity and a legacy RAN for voice connectivity. Subsequent to the connection to the LTE-RAN 210, the UE 110 may disconnect from the LTE-RAN 210 and connect to a legacy RAN to perform a voice call. Once the UE 110 completes the voice call on the legacy RAN, the UE 110 may then reconnect to the LTE-RAN 210. This reconnection to the LTE-RAN 210 would typically require the UE 110 to re-perform the cell selection process described above.

However, since the UE 110 has previously connected with the LTE-RAN 210, the exemplary embodiments modify the cell selection process to result in a cell reselection process that takes the previous connection to the LTE-RAN 210 into account when attempting to reconnect to the LTE-RAN 210. Specifically, the cell reselection process considers and prioritizes the cell reselection process based on the frequency and/or band on which the UE 110 was previously communicating with the eNB 220 of the LTE-RAN 210. In one exemplary embodiment, the UE 110 first prioritizes the cell reselection based on the previously used frequency. If the previously used frequency is not available, the UE 110 next prioritizes the cell reselection based on the previously used frequency band.

It should be apparent to those skilled in the art that this prioritization will make it more likely that the UE 110 will reconnect to one of the eNBs 220-240 of the LTE-RAN 210 using the same frequency or at least the same frequency band as was previously used, rather than just a strongest available frequency and/or band. Thus, if the UE 110 reconnects to the LTE-RAN 210 on the same frequency and/or band, it is more likely that the UE 110 will operate in the same mode (e.g., TDD or FDD) as was previously used by the UE 110 when connected to the LTE-RAN 210. By reconnecting to the LTE-RAN 210 and operating in the same mode, the UE 110 is more likely to fit into the traffic management scheme desired by the network operator.

It should also be noted that the cell reselection process is not the initial cell selection process (e.g. when the UE 110 first joins the LTE-RAN 210 upon initial or subsequent power-up), but rather after the UE 110 has been previously connected to the LTE-RAN 210 without a power down. The exemplary cell reselection process may be used by the UE 110 for any reconnection to the LTE-RAN 210 subsequent to the initial cell selection process. The cell reselection process is performed subsequent to the initial cell selection process because the UE 110 uses information (e.g., frequency and/or band information) from previous connections to the LTE-RAN 210. Upon the initial cell selection process, this information may not be available.

Figure 3:
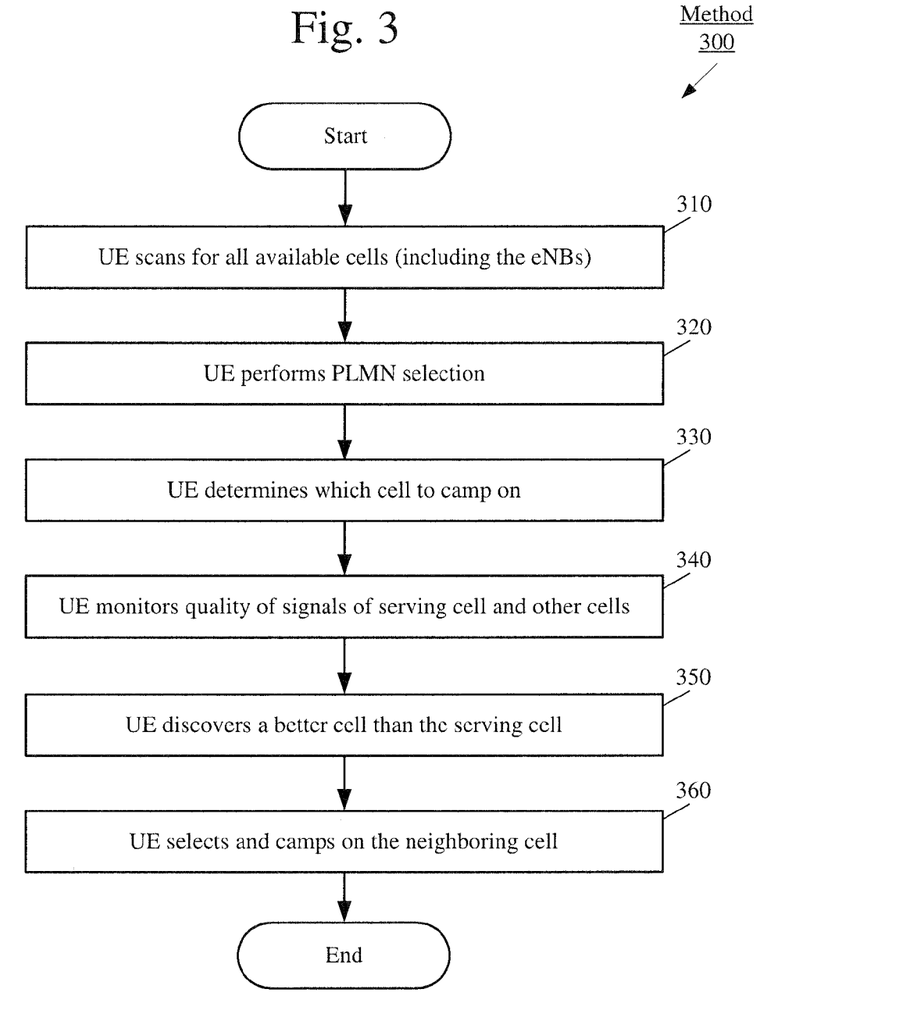
FIG. 3 shows an exemplary method for a cell selection process at a mobile device, such as the UE, in a wireless network, such as the LTE network, according to various embodiments described herein.

FIG. 3 shows an exemplary method 300 for a cell selection process (e.g., the initial cell selection process) by a mobile device, such as the UE 110, in a wireless network, such as the LTE-RAN 210, according to various embodiments described herein. As discussed above, the functions and operations of the UE 110 may be performed the exemplary processor 120, as well as the various components of the UE 110.

Initially, in 310, the UE 110 may scan for all available cells, such as the plurality of eNBs 220-240, in the area to establish contact with a public land mobile network ("PLMN"). Once a number of cells are detected, in 320, the UE may perform PLMN selection to search for an available mobile network. Normally, the UE 110 utilizes its home PLMN, however a new PLMN may be selected if the home PLMN is unavailable.

Upon PLMN selection, in 330, the UE 110 may use cell selection to determine which cell (e.g., eNB) to camp on and register its presence with the selected cell based on cell selection criteria. For instance, the UE 110 may create a candidate list of potential cells to camp on by using the cell selection process or, alternatively, stored cell selection information. During the cell selection process, the UE 110 scans all of the RF channels in the band to find a suitable serving cell. Typically, the UE 110 searches for the strongest cell on each network provider and reads its system information. Based on this information and the PLMN selection, the UE 110 is able to camp on the suitable cell (e.g., eNB 220).

In 340, the UE may continue monitor the quality and measurements of signals of the serving cell as well as other cells within the area. Specifically, the E-UTRAN may control the quality measurements for the cells that are to be re-selected. The UE 110 measurements may be triggered based on threshold levels for serving cell quality measurements. In 350, the UE 110 may discover a cell having stronger measurements than the serving cell in which the UE 110 is camped. Accordingly, in 360, the UE 110 may select and camp on the neighboring cell (e.g., eNB 230) over the initial serving cell (e.g., eNB 230). It may be noted that under typical scenarios, the UE may continue to re-select and camp on the cell having the strongest measurements.

As described above, for the case where a network provider utilizes the eCSFB infrastructure, the UE 110 may receive data connectivity via the LTE-RAN 210 and voice and ancillary services are provided through an existing legacy RAN (e.g., 3G network such as CDMA2000, 1×RTT, 1×, etc.). Accordingly, the exemplary UE 110 may be connected to the LTE-RAN for data communications. Subsequently, when a user of the UE 110 initiates a mobile originated ("MO") call or receives a mobile terminated ("MT") call, the UE 110 may switch from LTE to CDMA. When the voice call ends, the UE 110 may return to the LTE-RAN 210 by performing a cell reselection process as described above.

Figure 4:
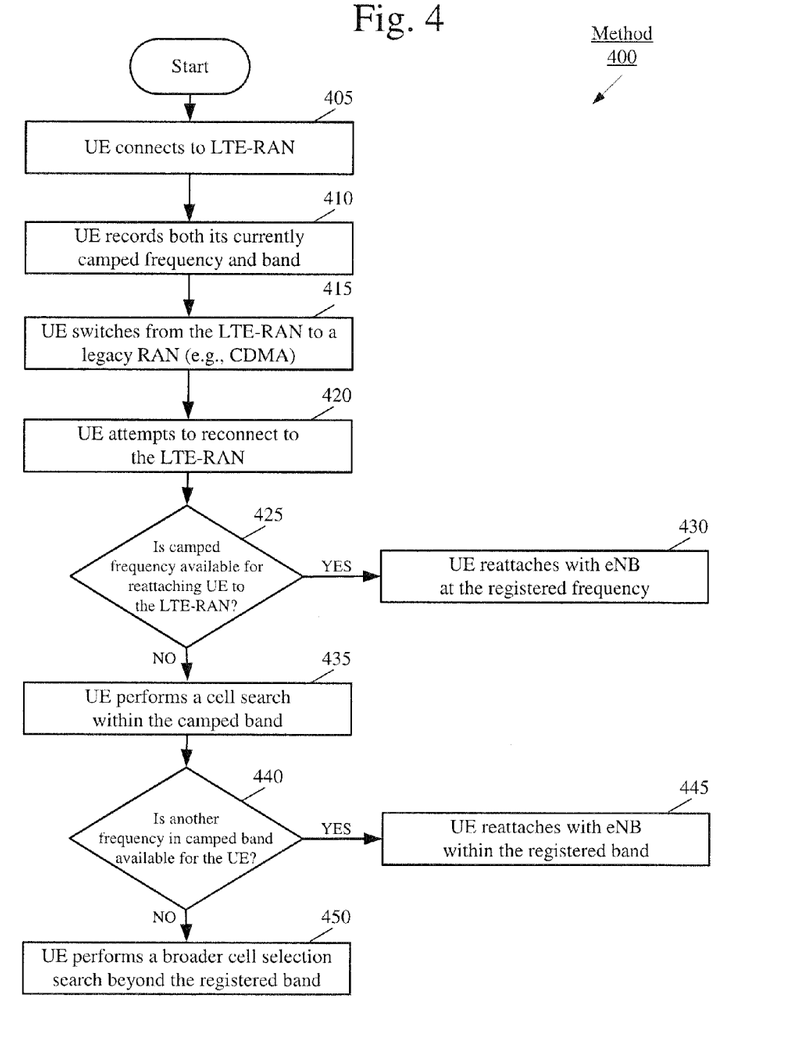
FIG. 4 shows an exemplary method for the UE to perform a cell reselection process to reconnect with the LTE network based on prioritizing a previously used frequency and/or band by the UE, according to various embodiments described herein.

FIG. 4 shows an exemplary method 400 for the UE 110 to perform a cell reselection process to reconnect with the LTE-RAN 210 based on prioritizing a previously used frequency and/or band by the UE 110, according to various embodiments described herein. In describing the method 400, it may be considered that the UE 110 is capable of communicating via two different protocols (e.g., LTE and CDMA).

In 405, the exemplary UE 110 may initially associate and communicate with the LTE-RAN 210 via the eNB 220. For example, the UE 110 may have performed the method 300 and selected and camped on the eNB 220. As described above, when the UE 110 camps on the eNB 220, the UE 110 communicates with the eNB 220 (e.g., transmit uplink information to and receive downlink information from) using a frequency within a frequency band. This frequency and frequency band will be termed the "camped frequency" and "camped band," respectively. In 410, the UE 110 may record both the camped frequency and the camped band with which it is communicating with the eNB 220.

In 415, the UE 110 may switch from the LTE-RAN 210 to the legacy RAN (e.g., CDMA). For instance, the UE 110 may receive or initiate a voice call. The MO or MT call may cause the UE 110 to disconnect from the LTE-RAN 210 and connect to the legacy RAN, such as a CDMA RAN for voice communications.

Upon the termination of the voice call over the legacy RAN, in 420, the UE 110 may attempt to reconnect to the LTE-RAN 210. In 425, the UE 110 may determine whether or not the camped frequency recorded in 410 is available for reconnecting the UE 110 to LTE-RAN 210. In other words, the highest priority attempt at reconnection is for the UE 110 to attempt to reconnect to the LTE-RAN on the last camped frequency. If the camped frequency is available, the method 400 may advance to 430 wherein the UE 110 may reconnect with the LTE-RAN 210 at the camped frequency. It should be noted that the UE 110 is likely to reconnect to the same eNB 220 to which the UE 110 was connected in 410. However, it is also possible that the UE 110, when connecting on the camped frequency, connects to one of the other eNBs 230 or 240 of the LTE-RAN 210. Accordingly, regardless of which eNB 220-240 the UE 110 attaches to in the LTE-RAN 210, the UE 110 may use the same frequency as the camped frequency in 405 and 430.

If the camped frequency is not available, the method 400 may advance to 435. In 435, the UE 110 may perform a cell search within the camped band. In other words, if the camped frequency is not available to the UE 110, the UE 110 may perform a narrowed cell search within the camped band recorded in 410. In 440, the UE 110 may determine whether or not a different frequency within the camped band recorded in 410 is available for use by the UE 110. If a different frequency of the camped band is available, the method 400 may advance to 445 wherein the UE 110 reconnects with an eNB 220-240 of the LTE-RAN 210 using a frequency within the camped band. As noted above, the UE 110 does not necessarily reconnect to the same eNB 220 as it was connected to in 410, and may connect to any eNB 220-240 using a frequency within the camped band in 410 and 445.

If the camped band is not available, the method 300 may advance to 450. In 450, the UE 110 may perform a broader cell selection search beyond the camped band identified in 410. For instance, the UE 110 may utilize the typical cell selection process as described in method 300.

Accordingly, the exemplary method 400 provides the UE 110 with additional tasks to perform prior to simply executing a fresh cell search using a comprehensive band scan. The method 400 allows the UE 110 to prioritize its cell search procedure based on the last camped LTE frequency/band upon reconnection to the LTE-RAN 210 following the use of a legacy RAN (e.g., CDMA during a voice call). As detailed above, the UE 110 may first attempt to register on the last camped LTE frequency. If that frequency is not available, the UE 110 may then proceed to execute a cell search within the last camped LTE band. Thus, this method 400 may reduce the amount of time required by the UE 110 to reconnect to the LTE-RAN 210 (e.g., the "return to LTE" time).

Moreover, because the UE 110 will reconnect to one of the eNBs 220-240 of the LTE-RAN 210 using the same frequency or at least the same frequency band, it is more likely that the UE 110 will operate in the same mode (e.g., TDD or FDD) as was previously used by the UE 110 when connected to the LTE-RAN 210. This means that upon reconnection with the LTE-RAN 210, the UE 110 is less likely to degrade the network operator's traffic management schemes.

It may be noted that the exemplary embodiments are described with reference to the LTE wireless communication system. However, those skilled in the art will understand that the exemplary embodiments may be applied to managing the frequency selection of a mobile device within any wireless communication schemes including those having different characteristics from the LTE scheme.

It will be apparent to those skilled in the art that various modifications may be made in the present invention, without departing from the spirit or scope of the invention. Thus, it is intended that the present invention cover the modifications and variations of this invention provided they come within the scope of the appended claims and their equivalents.

The invention claimed is:

1. A method, comprising:
   at a user equipment ("UE") having a transceiver configured to enable the UE to establish a connection to a first network at a camped frequency within a camped band using a first protocol and a second network using a second protocol:
   disconnecting from the first network and connecting to the second network;
   disconnecting from the second network; and
   performing a cell reselection for reconnection to the first network, wherein the cell reselection includes:
   scanning the camped frequency prior to searching any other frequencies to determine if the camped frequency is available for connection to the first network;
   connecting to the first network using the camped frequency when the camped frequency is available;
   scanning different frequencies within the camped band, when the camped frequency is not available, to determine which of the different frequencies within the camped band are available for connection to the first network;
   connecting to the first network using the one of the different frequencies within the camped band.

2. The method of claim 1, wherein determining whether the different frequencies within the camped band are available, comprises:
   performing a cell search in the camped band.

3. The method of claim 1, further comprising:
   performing a cell search within other frequency bands of the first network when neither the camped frequency nor camped band is available.

4. The method of claim 1, wherein the first network is a Long Term Evolution (LTE) network.

5. The method of claim 4, wherein the LTE network includes a plurality of evolved Node Bs (eNB) and the UE reconnects to the LTE network via one of the plurality of eNBs.

6. The method of claim 4, wherein the LTE network supports a time-division duplexing ("TDD") mode and a frequency-division duplexing ("FDD") mode.

7. The method of claim 1, wherein the second network is one of a GSM, CDMA, CDMA2000, 1×RTT, 1×, and a legacy radio access network.

8. A user equipment ("UE"), comprising:
   a transceiver configured to enable the UE to establish a connection to a first network at a camped frequency within a camped band using a first protocol and a second network using a second protocol; and
   a processor configured to:
   instruct the transceiver to disconnect the UE from the first network and connect the UE to the second network;
   instruct the transceiver to disconnect the UE from the second network; and
   instruct the transceiver to perform a cell reselection for reconnection to the first network, wherein the cell reselection includes:
   scanning only the camped frequency to determine if the camped frequency is available for connection to the first network; and
   when the camped frequency is available, connecting to the first network, using the camped frequency.

9. The UE of claim 8, wherein the cell reselection further includes:
   when the camped frequency is not available, scanning only different frequencies within the camped band to determine which of the different frequencies within the camped band are available for connection to the first network; and
   when at least one of the different frequencies within the camped band is available, connecting to the first network using the one of the different frequencies within the camped band.

10. The UE of claim 9, wherein the cell reselection further includes:
    when none of the different frequencies within the camped band are available, scanning frequencies outside of the camped band to determine which of the frequencies outside of the camped band are available for connection to the first network; and
    connecting to the first network using one of the available frequencies outside of the camped band.

11. The UE of claim 8, wherein the transceiver comprises a plurality of transceivers.

12. The UE of claim 8, wherein the first network is a Long Term Evolution (LTE) network.

13. The UE of claim 12, wherein the LTE network includes a plurality of evolved Node Bs (eNB) and the UE reconnects to the LTE network via one of the plurality of eNBs.

14. The UE of claim 12, wherein the LTE network supports a time-division duplexing ("TDD") mode and a frequency-division duplexing ("FDD") mode.

15. The UE of claim 8, wherein the second network is one of a GSM, CDMA, CDMA2000, 1×RTT, 1×, and a legacy radio access network.

16. A non-volatile computer-readable medium that stores instructions that, when executed, cause the performance of any action or combination of actions including:
    connecting to a first network at a camped frequency within a camped band;
    disconnecting from the first network and connecting to a second network;
    disconnecting from the second network; and
    performing a cell reselection for reconnection to the first network, wherein the cell reselection includes:
    scanning the camped frequency prior to searching any other frequencies to determine if the camped frequency is available for connection to the first network;
    connecting to the first network using the camped frequency when the camped frequency is available;
    scanning different frequencies within the camped band, when the camped frequency is not available, to determine which of the different frequencies within the camped band are available for connection to the first network;
    connecting to the first network using the one of the different frequencies within the camped band.

17. The non-volatile computer-readable medium of claim 16, wherein determining whether the different frequencies within the camped band are available, comprises:
    performing a cell search in the camped band.

18. The non-volatile computer-readable medium of claim 16, wherein the actions further include:
  performing a cell search within other frequency bands of the first network when neither the camped frequency nor the different frequencies within the camped band are available for connection to the first network.

* * * * *